(12) United States Patent
Panchev et al.

(10) Patent No.: US 11,481,310 B1
(45) Date of Patent: Oct. 25, 2022

(54) SELF-HEALING HYBRID ELEMENT IDENTIFICATION LOGIC

(71) Applicant: Progress Software Corporation, Bedford, MA (US)

(72) Inventors: Iliyan Panchev, Sofia (BG); Nikolay Atanasov, Sofia (BG); Miroslav Shtilianov, Sofia (BG)

(73) Assignee: PROGRESS SOFTWARE CORPORATION, Burlington, MA (US)

( * ) Notice: Subject to any disclaimer, the term of this patent is extended or adjusted under 35 U.S.C. 154(b) by 45 days.

(21) Appl. No.: 16/889,330

(22) Filed: Jun. 1, 2020

Related U.S. Application Data

(60) Provisional application No. 62/856,418, filed on Jun. 3, 2019.

(51) Int. Cl.
  *G06F 11/36* (2006.01)
  *G06F 11/07* (2006.01)
  *G06N 20/00* (2019.01)

(52) U.S. Cl.
  CPC ...... *G06F 11/3688* (2013.01); *G06F 11/0793* (2013.01); *G06F 11/3684* (2013.01); *G06F 11/3692* (2013.01); *G06N 20/00* (2019.01)

(58) Field of Classification Search
  CPC .............. G06F 11/3688; G06F 11/0793; G06F 11/3684; G06F 11/3692; G06N 20/00
  See application file for complete search history.

(56) References Cited

U.S. PATENT DOCUMENTS

| | | | |
|---|---|---|---|
| 7,536,599 B2* | 5/2009 | Paliwal ............... | G06F 11/2257 714/37 |
| 2008/0148101 A1* | 6/2008 | Thornley ............... | G06F 11/27 714/30 |
| 2010/0185895 A1* | 7/2010 | Clark ................ | G06F 11/0775 714/E11.113 |
| 2011/0107137 A1* | 5/2011 | Lam .................... | G06F 11/0793 714/4.4 |

(Continued)

OTHER PUBLICATIONS

"Self-Healing Tests." Support, 2 Sep. 2020, Website: https://support.smartbear.com/testcomplete/docs/testing-with/running/self-healing-tests.html. 5 pages.

(Continued)

*Primary Examiner* — Ziaul A Chowdhury
(74) *Attorney, Agent, or Firm* — Patent Law Works

(57) ABSTRACT

A system and method for receiving, using one or more processors, a first testing identifier associated with a first element of an application under test; receiving, using the one or more processors, a second testing identifier associated with the first element of an application under test; evaluating, using the one or more processors, the first testing identifier; determining, using the one or more processors, a failure of the first testing identifier to identify an element in the application under test; evaluating, using the one or more processors, the second testing identifier; identifying, using the one or more processors, the first element in the application under test based on the second testing identifier; and repairing, using the one or more processors, the first testing identifier to identify the first element in the application under test.

18 Claims, 9 Drawing Sheets

(56) References Cited

U.S. PATENT DOCUMENTS

2011/0314339 A1* 12/2011 Daily ................. G06F 11/0781
714/37
2019/0042397 A1* 2/2019 Vignesh R .......... G06F 11/3696

OTHER PUBLICATIONS

"Auto-healing Tests; Test are automatically updated when your UI changes. No more flaky tests." mabl.com, 2020, Website. https://www.mabl.com/auto-healing-tests. 3 pages.

"Unmatched Object Recognition Engine now including Artificial Intelligence." TestComplete., Smartbear.com, 2020, Website. https://smartbear.com/product/testcomplete/features/gui-object-recognition/. 3 pages.

* cited by examiner

SELF-HEALING HYBRID ELEMENT IDENTIFICATION LOGIC

CROSS REFERENCE TO RELATED APPLICATIONS

The present application claims priority, under 35 U.S.C. § 119, of U.S. Provisional Patent Application No. 62/856,418, filed Jun. 3, 2020 and entitled "Self-Healing Hybrid Element Identification Logic," the entirety of which is hereby incorporated by reference.

FIELD OF INVENTION

The present disclosure relates to automated software testing.

BACKGROUND

Automated tests execute certain actions against an application under test and verify if the actual data and results match the expected data and results. Each object in the application, for example, a "Login" button on a webpage, referred to as an element, is uniquely identified to ensure that the automated test uses the correct element for actions (click, double click, typing text, etc.) and verifications of the desired data or state of the element.

There are several ways of identifying elements, for example—by a unique combination of element's attributes, by a captured image of the element, by its position inside the Document Object Model (DOM) tree of a web page, etc. Each identification has its pros and cons. For example, an element with dynamically generated ID is difficult to identify by its attributes, especially ID, so using a picture identification may be more suitable.

As an application is developed and changed, the identification logic used by the automated software testing tool may be broken causing a failure of identification during test execution. When the identification fails during test execution, the element is not found, and the automated test cannot finish normally. This is a common scenario resulting into interrupted automated tests, lack of reliable results, and time needed to fix the broken identification.

Therefore, existing systems fail to, among other things, use the different types of identification logic not only to identify the element, but fail also to use different types of identification to fix the primary identification when broken.

SUMMARY

In general, an innovative aspect of the subject matter described in this disclosure may be embodied in methods that include receiving, using one or more processors, a first testing identifier associated with a first element of an application under test; receiving, using the one or more processors, a second testing identifier associated with the first element of an application under test; evaluating, using the one or more processors, the first testing identifier; determining, using the one or more processors, a failure of the first testing identifier to identify an element in the application under test; evaluating, using the one or more processors, the second testing identifier; identifying, using the one or more processors, the first element in the application under test based on the second testing identifier; and repairing, using the one or more processors, the first testing identifier to identify the first element in the application under test.

In general, another innovative aspect of the subject matter described in this disclosure may be embodied in a system that includes one or more processors a memory storing instructions that, when executed by the one or more processors, cause the system to: receive a first testing identifier associated with a first element of an application under test; receive a second testing identifier associated with the first element of an application under test; evaluate the first testing identifier; determine a failure of the first testing identifier to identify an element in the application under test; evaluate the second testing identifier; identify the first element in the application under test based on the second testing identifier; and repair the first testing identifier to identify the first element in the application under test.

Other implementations of one or more of these aspects include corresponding systems, apparatus, and computer programs, configured to perform the actions of the methods, encoded on computer storage devices. These and other implementations may each optionally include one or more of the following features. The first testing identifier and the second testing identifier are received by recording a test session in which a user interacts with elements of the application under test. The first testing identifier and second testing identifier are determined and suggested for use to identify the first element in the application under test during the recorded test session. Generating the first testing identifier and the second testing identifier; and recommending use of the first testing identifier and second testing identifier to identify the first element in the application under test for testing. Repairing the first testing identifier is responsive to receiving user input approving the suggested repair. The suggested repair is generated based on one or more of machine learning and a best practice. Repairing the first testing identifier does not alter a type associated with the first testing identifier. Repairing the first testing identifier alters a type associated with the first testing identifier. The first testing identifier and the second testing identifier are of a different type selected from a location-based identifier, an image-based identifier, and an attribute-based identifier. Receiving a third testing identifier; receiving a fourth testing identifier, a set of identifier types associated with the first and second test identifiers differing from a set of identifier types associated with the third and fourth testing identifiers; evaluating the third testing identifier; determining a failure of the third identifier to identify an element in the application under test; evaluating the fourth testing identifier; identifying a second element in the application under test based on the fourth testing identifier; and repairing the third testing identifier to identify the second element in the application under test.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Existing test automation tools support only one way of identifying an element. Additionally, even if an existing test automation tool supports multiple ways of identifying an element, such a test automation tool may force the user to choose one method of identification to be used for identifying all elements in an application under test, and may not allow some elements to use one way of identification (e.g. by a captured image) and other elements to use another (e.g. position within the DOM) in the same application under test. Furthermore, existing test automation tools do not allow an individual element to be identified in multiple ways (e.g. by both a captured image and position within the DOM). Therefore, existing test automation tools fail to, among other things, use the different types of identification logic not only to identify the element, but fail also to use different types of identification to fix the primary identification when broken. By contrast, the self-healing hybrid element identification described herein identifies an element in multiple ways (e.g. by both a captured image and position within the DOM) and may use the multiple identifications to self-heal a broken primary identifier for an element using a secondary identifier for that element. Such self-healing may dramatically increase the stability of automated tests and to decrease the maintenance time needed for these tests.

Figure 1:
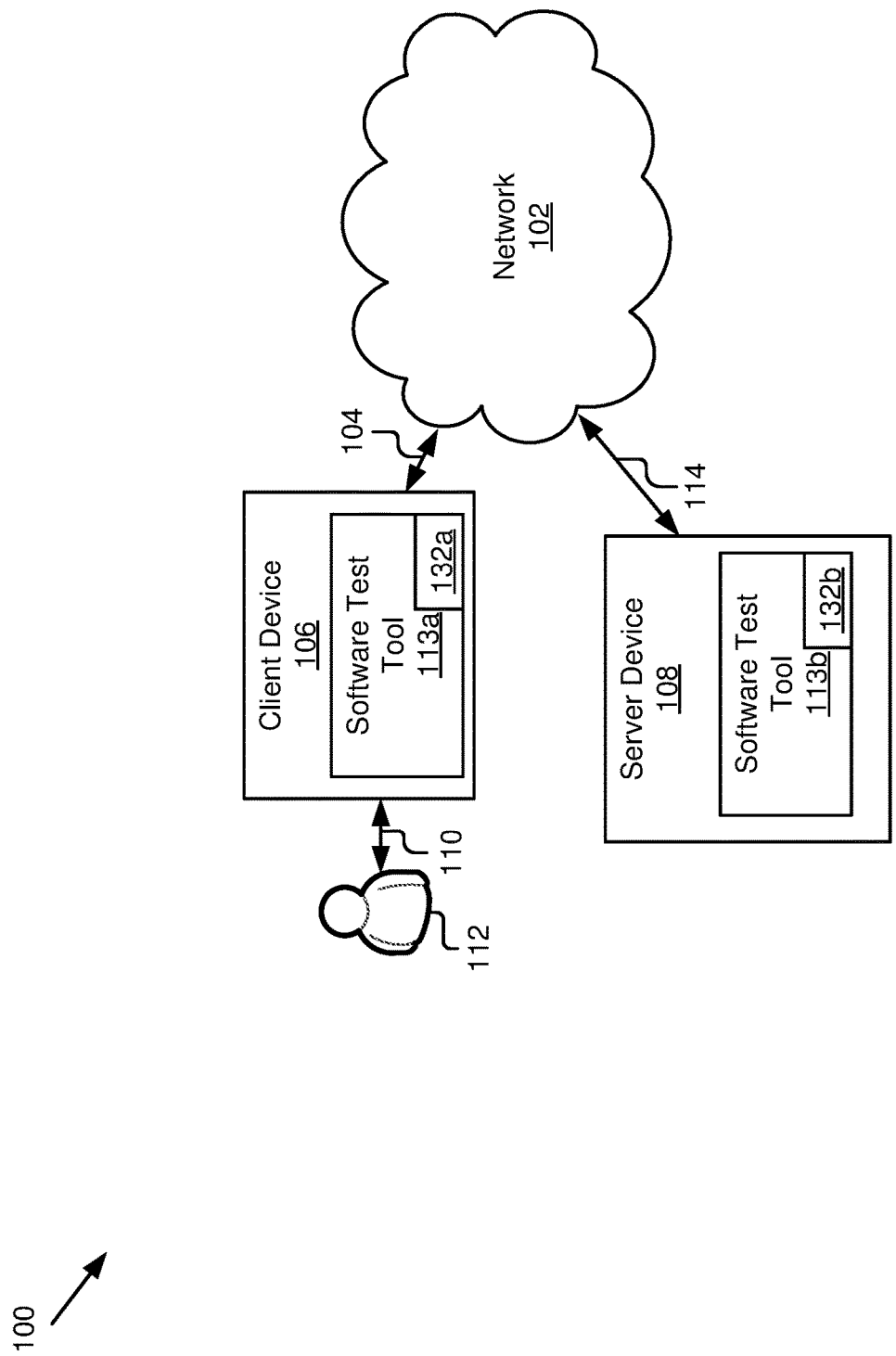
FIG. 1 is a block diagram illustrating an example system for self-healing hybrid element identification according to one embodiment.

FIG. 1 is a block diagram illustrating an example system 100 for self-healing hybrid element identification according to one embodiment. Depending on the embodiment, the features and functionality of the self-healing hybrid identifier 132, described below, may be offered, in-whole or in-part, locally, on the client device 106 or as an online service. In some embodiments, the features and functionality of the self-healing hybrid identifier 132, described below, may be offered locally, on the client device 106. For example, the software test tool 113a, the self-healing hybrid element identifier 132a, or portions thereof, may reside on the client device 106, for example, stored in a memory and executable by a processor of the client device 106. In some embodiments, the features and functionality of the self-healing hybrid identifier 132, described below, may be offered as an online service. For example, the software test tool 113b, the self-healing hybrid element identifier 132b, or portions thereof, may reside on a server 108, for example, stored in a memory and executable by a processor of the server 108.

The client device 106 is a computing device having data processing and communication capabilities. While FIG. 1 illustrates a single client device 106, the present description applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client device 106 may couple to and communicate with another client device (not shown) and the other entities (e.g. server 108) of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While a client device 106 is depicted in FIG. 1, as previously mentioned, the system 100 may include any number of client devices 106. In addition, when the system 100 includes multiple client devices (not shown), the client devices 106 may be the same or different types of client devices 106.

The server 108 may include one or more computing devices having data processing, storing, and communication capabilities. For example, the server 108 may include one or more hardware servers, server arrays, storage devices, systems, etc., and/or may be centralized or distributed/cloud-based. In some implementations, the server 108 may include one or more virtual servers, which operate in a host server environment and access the physical hardware of the host server including, for example, a processor, memory, storage, network interfaces, etc., via an abstraction layer (e.g., a virtual machine manager).

In embodiments where the features and functionality of the self-healing hybrid identifier 132 are offered, in-whole or in-part, as an online service. The client device 106 is communicatively coupled, via a network 102, for interaction with the server 108. For example, the client device 106 may be coupled to the network 102, via signal lines 104, and accessed by user 112, as illustrated by line 110, and the server 108 may be coupled to the network 102, via signal line 114.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the Hypertext Markup Language (HTML), the Extensible Markup language (XML), JavaScript Object Notation (JSON), YAML Ain't Markup Language (YAML), Electronic Data Interchange (EDI) including those in the EDI-FACT and X12 families, ACORD/AL3, various National Council for Prescription Drug Programs (NCPDP) standards, Comma Separated Values (CSV), etc. In addition, all or some data can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

Depending on the embodiment, an application under test may developed locally on the server 108 or client device 106 or may be received via the network 102 or transferred between the two devices by other means, for example, using a USB Flash Drive or other storage device.

It should be understood that the system 100 illustrated in FIG. 1 is representative of an example system for self-healing hybrid element identification according to one embodiment, and that a variety of different system environments and configurations are contemplated and are within the scope of the present disclosure. For instance, various functionality may be moved between devices (e.g. from a server 108 to a client 106, or vice versa) and some implementations may include additional or fewer computing devices, services, and/or networks, and may implement various functionality client or server-side. Further, various entities of the system 100 may be integrated into a single computing device or system or additional computing devices or systems, etc.

Figure 2:
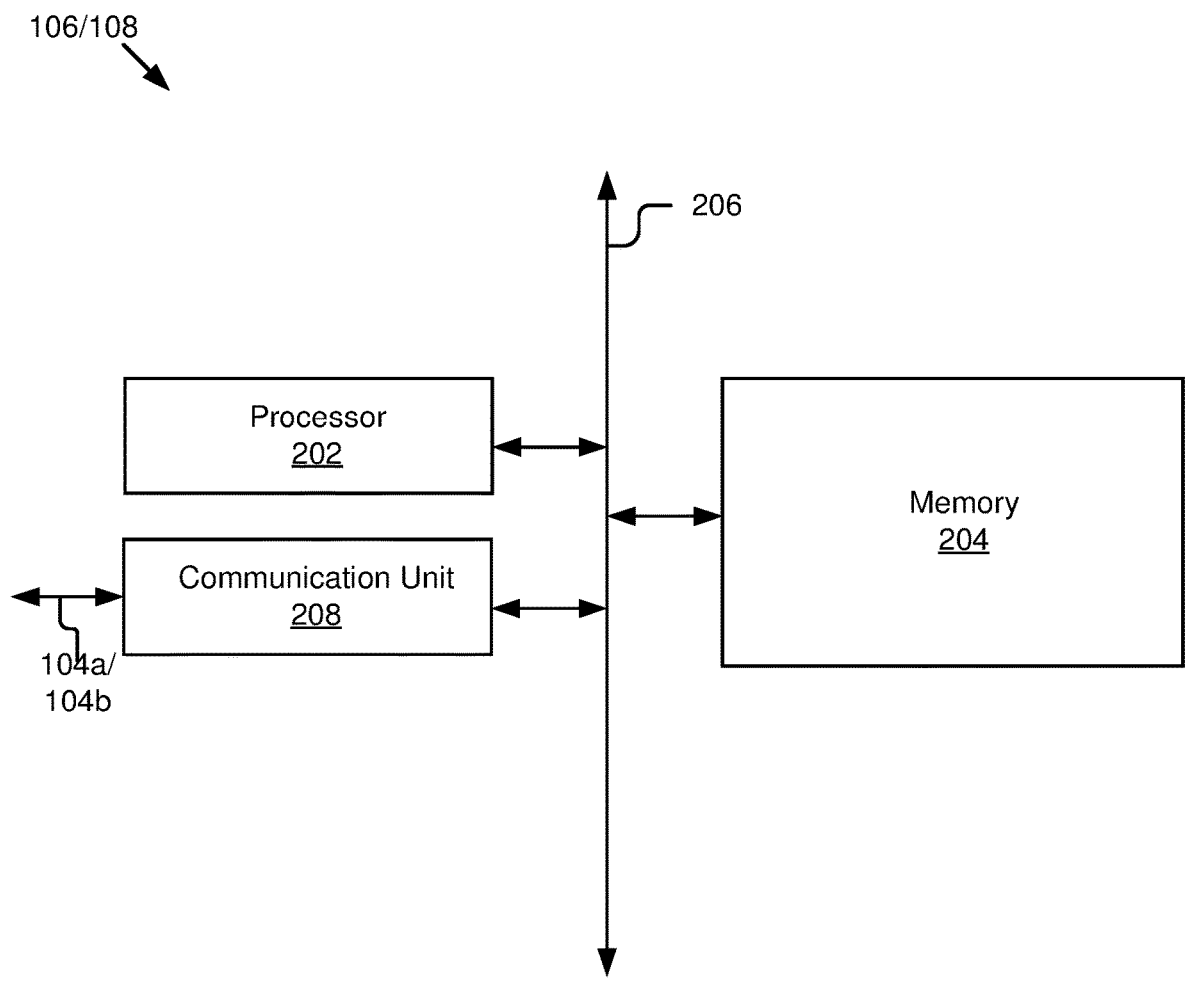
FIG. 2 illustrates an example computing device according to one embodiment.

FIG. 2 illustrates an example computing device according to one embodiment. In one embodiment, a computing device, such as a client device 106 or server 108, may include a processor 202, a memory 204, and a communication unit 208, which may be communicatively coupled by a bus 206. However, it should be understood that a computing device may take other forms and include additional or fewer components without departing from the scope of the present disclosure. For example, a computing device may include input and output devices (e.g., a display, a keyboard, a mouse, touch screen, speakers, etc.), various operating systems, sensors and other physical configurations.

The processor 202 may execute code, routines and software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory of the computing device via the bus 206 to access data and instructions therefrom and store data therein. The bus 206 may couple the processor 202 to the other components of the computing device including, for example, the memory 204 and communication unit 208.

The memory 204 may store and provide access to data to the other components of the computing device. In some implementations, the memory 204 may store instructions and/or data that may be executed by the processor 202. The memory 204 is also capable of storing other instructions and data, including, for example, an operating system, hardware drivers, other software applications, databases, etc. The memory 204 may be coupled to the bus 206 for communication with the processor 202 and the other components of the computing device. In one embodiment, the memory 204 of the computing device stores the code and routines that, when executed by the computing device's processor 202, perform the functions as described herein. For example, the functionality described below may be performed when code and routines associated with the self-healing hybrid identifier 132 and stored in memory 204 are executed by processor 202.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory may be a single device or may include multiple types of devices and configurations.

The bus 206 can include a communication bus for transferring data between components of a computing device or between computing devices, a network bus system including the network 102 or portions thereof, a processor mesh, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor to the network 102, which may in turn be coupled to other processing systems. The communication unit 208 can provide other connections to the network 102 and to other entities of the system 100 using various standard network communication protocols, including, for example, those discussed elsewhere herein.

As mentioned above, a computing device may include other and/or fewer components. Examples of other components may include a display, an input device, a sensor, etc. (not shown). In one embodiment, the computing device includes a display. The display may display electronic images and data output by the computing device for presentation to a user. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the computing device. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Figure 3:
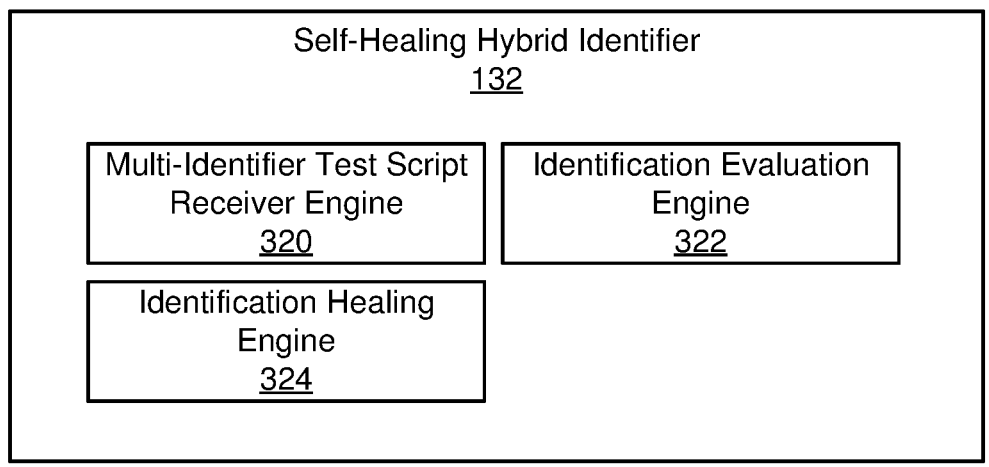
FIG. 3 is a block diagram illustrating an example self-healing hybrid element identifier according to one embodiment.

Referring now to FIG. 3, a block diagram illustrating an example self-healing hybrid identifier 132 is described according to one embodiment. In one embodiment, the self-healing hybrid identifier 132 includes a multi-identifier test script receiver engine 320, an identification evaluation engine 322, and an identification healing engine 324.

The components (e.g., 320, 322, and 324), or subset thereof can be software or routines for providing the features and functionalities described herein. In one embodiment, the engines, or subset thereof, are a set of instructions executable by a processor 202. In one embodiment, the engines, or subset thereof, are stored in a memory 204 and are accessible and executable by a processor 202. In one embodiment, the engines, or subset thereof, are adapted for cooperation and communication with a processor 202 and other components of the computing device including other engines, sub-engines or subset thereof.

The multi-identifier test script receiver engine 320 receives a test script in which one or more elements of a software under test is identified using multiple identifiers, also referred to as a "multi-identifier test script." For example, in one embodiment, a first elements of the software under test is identified using multiply types of identifiers (e.g. two or more of (1) the element's attributes or properties, (2) the element's image(s), and (3) the element's position) in the multi-identifier test script. In another example, in one embodiment, all elements of the software under test that are identified in the multi-identifier test script are identified using multiply types of identifiers (e.g. two or more of (1) the element's attributes or properties, (2) the element's image(s), and (3) the element's position) in the multi-identifier test script.

Depending on the embodiment and the software under test, the elements supported may include, but are not limited to, one or more of a web element, a Hyper Text Markup Language (HTML) element, a desktop application element (e.g. using HTML and JavaScript), an Extensible Application Markup Language (XAML) element (e.g., Windows Presentation Foundation (WPF) or Xamarin), and an XPATH model (e.g. for native desktop applications).

In one embodiment, the multi-identifier test script receiver engine 320 receives the multi-identifier test script based on a recorded session. For example, in one embodiment, the multi-identifier test script receiver engine 320 automatically records actions performed against elements within the software under test during a recorded test session, identifies those elements using multiple identifiers, and automatically generates a multi-identifier test script based on the recorded actions against the identified elements.

In one embodiment, the multiple identifiers used by the multi-identifier test script receiver engine 320 in the multi-identifier test script are based on machine learning. For example, assume that, in one embodiment, the self-healing hybrid identifier 132 determines (using machine learning applied to iterations of identifying elements and healing identifiers) that image-based identification is more prone to failure (as different monitor scale and resolution can break the image recognition algorithms), and the multi-identifier test script receiver engine 320 uses images as a secondary identifier (using another identifier method, such as DOM expression as a primary identifier) and/or stores multiple, valid images (e.g. with different sizes) for the element. In another example, assume that, in one embodiment, the self-healing hybrid identifier 132 determines patterns and generates a multi-identifier test script based on those patterns (e.g. automatically identifies elements, in an application under test (AUT), that are associated with a login, such as a user name and password, and automatically generates a script including machine-learned login-related-actions and multiple, appropriate identifiers for those login elements.

In one embodiment, the multiple identifiers used are based on best practices coded into the multi-identifier test script receiver engine 320. For example, assume that use of an index alone as an identifier is less than ideal, as the index of an element may change as a table is modified. In one embodiment, the multi-identifier test script receiver engine 320 identify an element using a first identifier that includes both the index and a value (e.g. textContent value), and an image (or set of images stored in a repository) as second identifier.

In one embodiment, the multiple identifiers used are based on user input. For example, in one embodiment, the multi-identifier test script receiver engine 320 receives user input selecting a DOM expression as a primary identifier and an image as a secondary identifier. In another example, in one embodiment, the multi-identifier test script receiver engine 320 receives user input overriding a machine-learning based suggestion that a DOM expression (e.g. XPath) be a primary identifier and an image-based identifier be secondary (e.g. to reverse their relative priority or include a different identification method, such as attribute/property-based identification in addition to or in lieu of a DOM expression or image-based identifier).

In one embodiment, the multiple identifiers used are consistent throughout the multi-identifier test script. For example, all elements are identified by a DOM expression and an image. In another embodiment, the set of multiple identifiers used may vary element-to-element in type (e.g. variable combination of two or more of parameters/values, location, and image), specifics (e.g. using different sets of parameters for different elements), or both.

In one embodiment, the multi-identifier test script receiver engine 320 receives the multi-identifier test script from memory. For example, the multi-identifier test script receiver engine 320 retrieves a multi-identifier test script generated from a previously recorded test session so it can be reapplied to the AUT or applied to an updated version of the AUT. In another example, the multi-identifier test script receiver engine 320 retrieves a multi-identifier test script that has been coded (e.g. manually written by a user 112).

For clarity and convenience, an example which identifies the element by its picture (visual identification), textContent property (the value of the textContent property of the element), and XPath expression (the full path of the element in the DOM tree of its page) is occasionally referenced below. However, it should be recognized that these are merely examples selected for convenience and that other elements and identifiers and combinations thereof are within the scope of this description.

In one embodiment, the identification evaluation engine 322 evaluates whether identifiers are consistent with best practices. For example, assume one of the element identification methods is using tag and index in its find logic. Also, assume this is a valid way to locate an element, but it is not recommended as a best practice. Leveraging machine learning and data gathered, in one embodiment, the identification evaluation engine 322 proposes to replace, or automatically replaces, this identification logic with a more robust one based on unique element properties.

The identification evaluation engine 322 detects a failure of one or more identifiers. In one embodiment, the identification evaluation engine 322 detects a failure of one or more identifiers by comparing the identifiers in the AUT to an expected value (i.e. the identifiers within the multi-identifier test script). The mechanisms and specifics of the comparison may vary depending on the embodiment and the type of identifier.

For example, the identification evaluation engine 322 detects an identification failure based on comparing a current property of an element in the AUT to an expected, or test, property. For example, the modified textContent property of the element to the previous, test textContent property, and detects a failure when the two properties do not match.

In another example, the identification evaluation engine 322 detects an identification failure based on comparing a current image to an expected, or test, image. For example, the identification evaluation engine 322 compares a current image of the element to a test image on file, and detects failure when the two images do not match. Because images-based identification is sensitive to external factors (e.g. monitor resolution or size), the identification evaluation engine 322, in one embodiment, identifies a failure when a threshold level of difference is detected. For example, the identification evaluation engine 322 determines a match unless there is more than a 50% difference between the image in the AUT and the expected, or test, image identifier. Because images-based identification is sensitive to external factors (e.g. monitor resolution or size), in one embodiment, the multi-identifier test script receiver engine 320 generates a repository of multiple images (e.g. having different resolution and/or scales) when applying image-based identification to an element in the multi-identifier test script, and the identification evaluation engine 322 compares a current image of the element to the set of images in the repository to determine if any match, and identifies a failure if there is no match.

In yet another example, the identification evaluation engine 322 detects an identification failure based on comparing a current XPath expression to an expected, or test, XPath expression. For example, the identification evaluation engine 322 compares a current position of the element to a test XPath expression, and detects failure when the two XPath expression do not match.

The identification evaluation engine 322 detects a failure of identification by a first identifier. For example, consider the above example regarding an element. Assume that the textContent (i.e. an example property) is a primary identifier of the automation element and also assume that value of the textContent property is changed. In existing systems, this leads to a failure because the identification methods (if multiple are even supported or used) are not evaluated independently. However, that is not the case with the identification evaluation engine 322. The identification evaluation engine 322 detects the failure, and the identification evaluation engine 322 evaluates alternative identifiers.

The identification evaluation engine 322 evaluates alternative identifiers. In embodiments, the identification evaluation engine 322 evaluates an alternative identifier responsive to a failure of a superior ranked identifier (e.g. failure of the primary identifier results in evaluation of the secondary identifier, failure of a secondary identifier results in evaluation of a tertiary identifier if present, etc.). In some embodiments, the identification evaluation engine 322 evaluates the identification methods independently. For example, the identification evaluation engine 322 evaluates the primary identifier, secondary identifier, etc. (properties, the images, and the XPath expressions in the present example) independently (serially or in parallel, depending on the embodiment), so that an alternative identifier is evaluated even if the primary identifier works correctly. Independent evaluation of the identifiers associated with the element ensures more robust identification logic. By identifying failures in the alternative identifiers (e.g. secondary identifier), they may be healed by the identification healing engine 324 even when the primary identifier does not fail and the automated test can run to completion. Healing the failed secondary identifier allows the identification evaluation engine 322 to evaluate that second identifier in subsequent tests. Should the primary identifier fail in the future (e.g. due to a modification to the application under test), the healed secondary identifier may be used by the identification healing engine 324 to heal that failed primary identifier.

Based on the evaluation performed by the identification evaluation engine 322, the identification healing engine 324 repairs the identifier. Depending on the embodiment, the repair may be automatic or require input or confirmation by a user. In some embodiments, the repair is automatic and the failed/broken identifier is repaired (e.g. by updating the value of the textContent property) without user input.

In some embodiments, the repair requires user input. For example, the identification healing engine 324 suggests the repair for failed/broken identifier and requests user approval, and repairs the failed/broken identifier responsive to receiving user input approving the suggestion. For example, the identification healing engine 324 suggests updating the value of the textContent property, and, responsive to a user input approving the suggestion, updates the value of the textContent property. In another example, the identification healing engine 324 engages the user in a conversation (e.g. using an AI chatbot) and with multiple choice options generated based on a Machine Learning (ML) model using gathered data. In one embodiment, the multiple-choice options are determined and/or ranked based on gathered data (e.g. to present the element(s) which a failed identifier is supposed to identify or the best candidate identifiers).

In some embodiments, the automation of the repair is based on machine learning and/or iterative. For example, the identification healing engine 324 uses machine learning and may initially request user input, and in subsequent iterations, based on prior user inputs/approvals, perform repairs (for which it previously requested, or would have request, approval) automatically.

In one embodiment, the machine learning and data gathered are specific to the AUT. For example, the data gathered and used to train the machine learning is specific to a AUT and not used in association with a different AUT, and as the AUT is modified and tests are run or re-run the machine learning is trained and retrained on that data. In one embodiment, the machine learning cross trains, using data and/or machine learning models associated with one or more other AUTs. For example, data gathered for a first AUT or a machine learning model trained for a first AUT may be used in association with a second AUT (e.g. to create an ensemble machine learning model, to provide additional training data and avoid cold-start issues, etc.

Using machine learning algorithms, the self-healing hybrid identifier 132 may detect weaknesses in the identification logic and improve it automatically, or, if user input is desirable, to report the weaknesses back to the user providing suggestions for improving the stability of the automated tests. With each iteration where the element identification logic is evaluated, the self-healing hybrid identifier 132 may gather data for the element type, element identification methods preferred by the user(s), images of the elements used in the automation, images of the app under test, etc. The self-healing hybrid identifier 132 may combine the collected data with the predefined best practices in creating robust element find identification logic, highlight problems, or give suggestions to the user on how to improve his element identification directly after the creation of a new element or after every iteration where a certain find logic was used to identify an element.

Example 1: Assume an AUT has a list of combo boxes in a single page where the user has manually refined the identification logic by adding the text value in the element identification. With that data point, the multi-identifier test script receiver engine 320 may automatically add this element identification logic the next time an element is created for a button of the same type in the same page.

Example 2: Assume one of the element identification methods is using tag and index in its find logic. Also, assume this is a valid way to locate an element, but it is not recommended as a best practice. Leveraging the data gathered, in one embodiment, the identification evaluation engine 322 proposes to replace this identification logic with a more robust one based on a set of unique element properties identified using machine learning.

Example 3: The self-healing hybrid identifier 132 detects that the user is attempting to identify a certain element from the application under test by a dynamic attribute. The self-healing hybrid identifier 132 warns the user by starting a conversation and propose a better solution without the need of a more complex debugging process. See, for example, FIG. 7, which describes dynamic element awareness according to one embodiment.

Therefore, according to some embodiments, when one identifier, or identification method, fails, the self-healing hybrid identifier 132 finds the element by one (or more) of other identifiers, or identification methods. In that way the test continues without interruption or on its next run. Therefore, the disclosure herein may increase overall automation stability, and the results of the testing are more reliable and fuller.

The self-healing hybrid identifier 132 may provide one or more of the following potential benefits:
1. Creating stable automated tests that provide reliable results, thus increasing application quality and chances for the development team's success.
2. Decreasing test maintenance time which increases the efficiency and the velocity of the development team, letting them focus on more productive and creative tasks.
3. Minimize the need for complex debugging process on element identification failures by engaging the user in a conversation with multiple choices and tailored suggestions.

Example Methods & Flow Charts

FIGS. 4-9 illustrate example methods and workflows that can be performed by the system 100 and components thereof described in FIGS. 1-3. It should be recognized that FIGS. 4-9 are merely examples, and that the workflows may be modified (e.g. additional or other blocks may be added, blocks may be omitted, and blocks may be rearranged) without departing from the scope of the disclosure herein.

Figure 4:
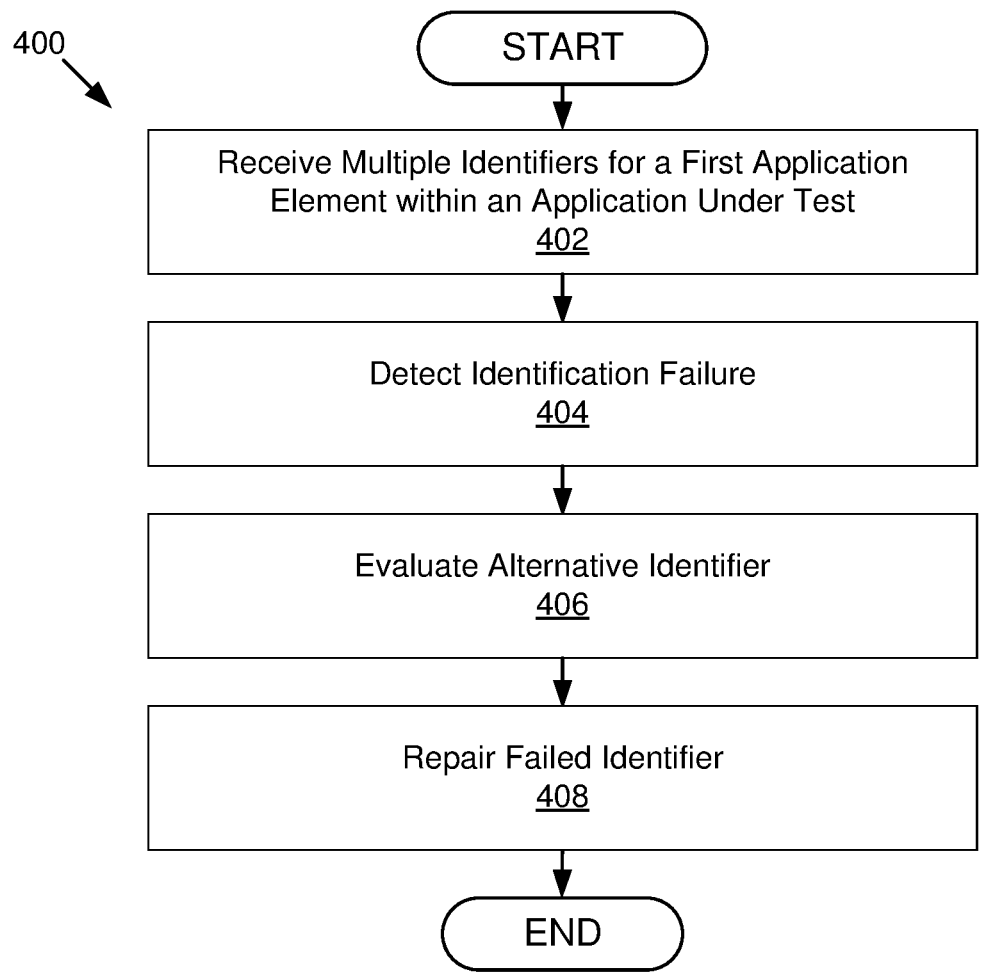
FIG. 4 is a flowchart of an example method for self-healing hybrid element identification according to one embodiment.

Referring to FIG. 4, an example method 400 for self-healing hybrid element identification according to one embodiment is shown. At block 402, the multi-identifier test script receiver engine 320 receives multiple identifiers associated with a first application element within an application (e.g. web application) under test. At block 404, the identification evaluation engine 322 detects an identification failure of a first identifier associated with the first application element. At block 406, the identification evaluation engine 322 evaluates an alternative identifier associated the first application element. At block 408, the identification healing engine 324 repairs the first identifier associated with the first application element.

Figure 5:
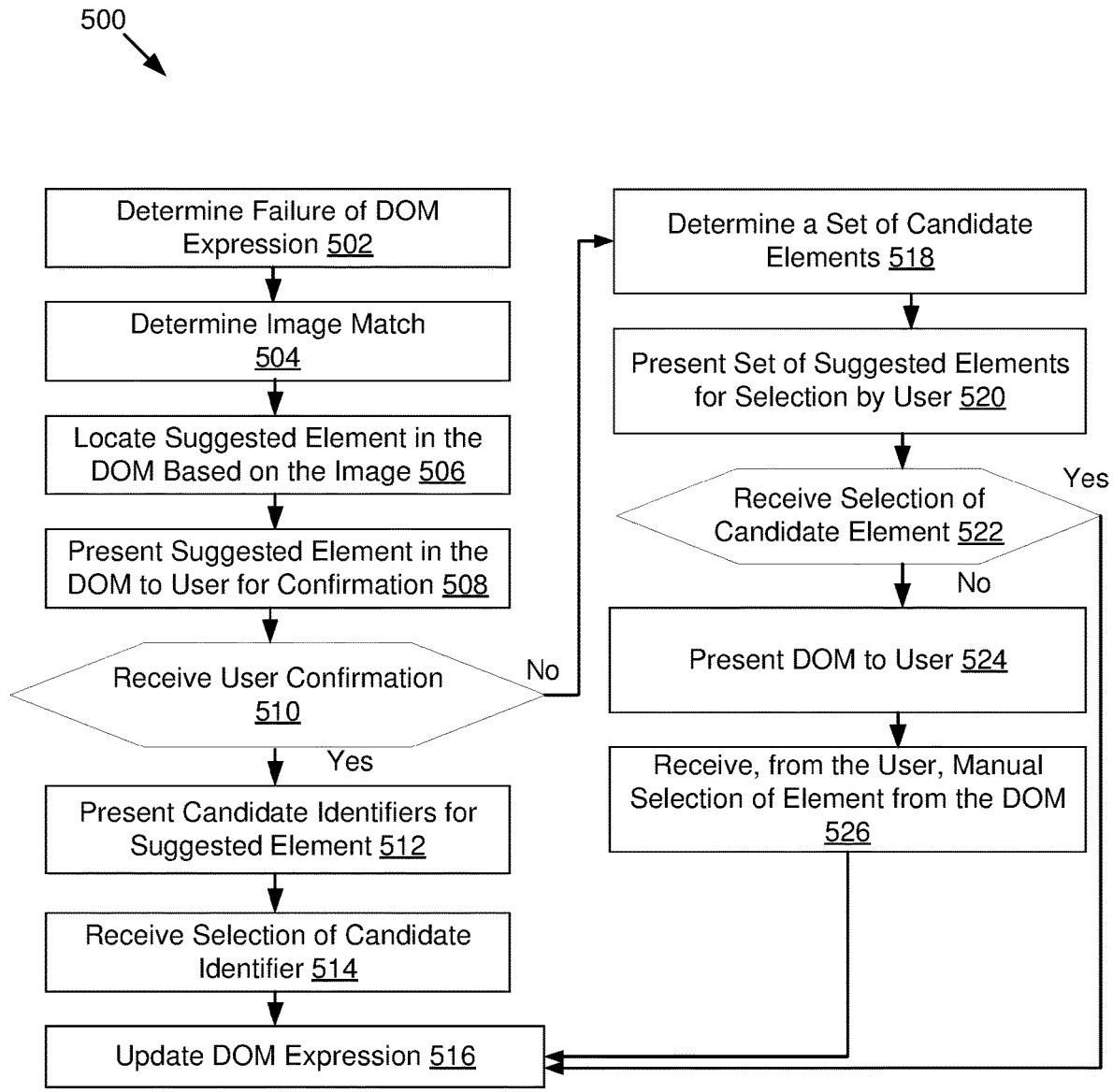
FIG. 5 is flowchart of another example method for self-healing hybrid element identification illustrated according to one embodiment.

Referring to FIG. 5, an example method 500 for self-healing hybrid identification is illustrated according to one embodiment. For clarity and convenience, FIG. 5 is described with reference to an example in which an element is identified by its image and a DOM location expression. For example, the DOM expression tagName:Input Index:8, which represents an example of DOM based element query to locate the $8^{th}$ element with tagName: Input. Also, assume that the application has changed in such a way that one of the other Input elements no longer exists, which changes the index of the intended element to 7 which, at block 502, leads to a failed location attempt, by the identification evaluation engine 322, using the DOM expression. At block 504, the identification evaluation engine 322, determines that a match using the image exists In some embodiments, although the automated test is able to continue using the element identified based on the image at block 504, the identification healing engine 324 resolves the problem with the DOM based find expression to ensure robust element identification logic. In the illustrated embodiment, at block 506, the identification healing engine 324 identifies a suggested element in the DOM based on the image, which matched, and presents, at block 508, the element in the DOM for the user 112 to confirm (e.g. highlights the element in the DOM and displays its image).

When the identification healing engine 324 receives confirmation 510—Yes that the suggested element in the DOM is the appropriate element, at step 512, the identification healing engine 324 presents a list of one or more candidate identifiers; receives, at step 514, from the user 112 a selection of a candidate identifier (e.g. Tag: Input name: myinput); and updates, at 516 the DOM expression (e.g. Tag: Input name: myinput).

When the identification healing engine 324 receives no confirmation (e.g. receives indication that that the suggested element in the DOM is not the appropriate element) 510—No, the identification healing engine 324, at step 518, generates a set of candidate elements, and, at step 520, presents the set of candidate elements for selection by the user. When a user selection of a candidate element from the set is received 522—Yes, the identification healing engine 324 updates, at 516 the DOM expression based on the selection of the candidate element. When a user selection of a candidate element from the set is not received (e.g. the user indicates the appropriate element is not among the set of candidate elements) 522—No, the identification healing engine 324 presents the DOM to the user, at 524; receives, at 526, a manual selection of an element in the DOM from user 112; and updates, at 516, the DOM expression based on that manual selection.

Figure 6:
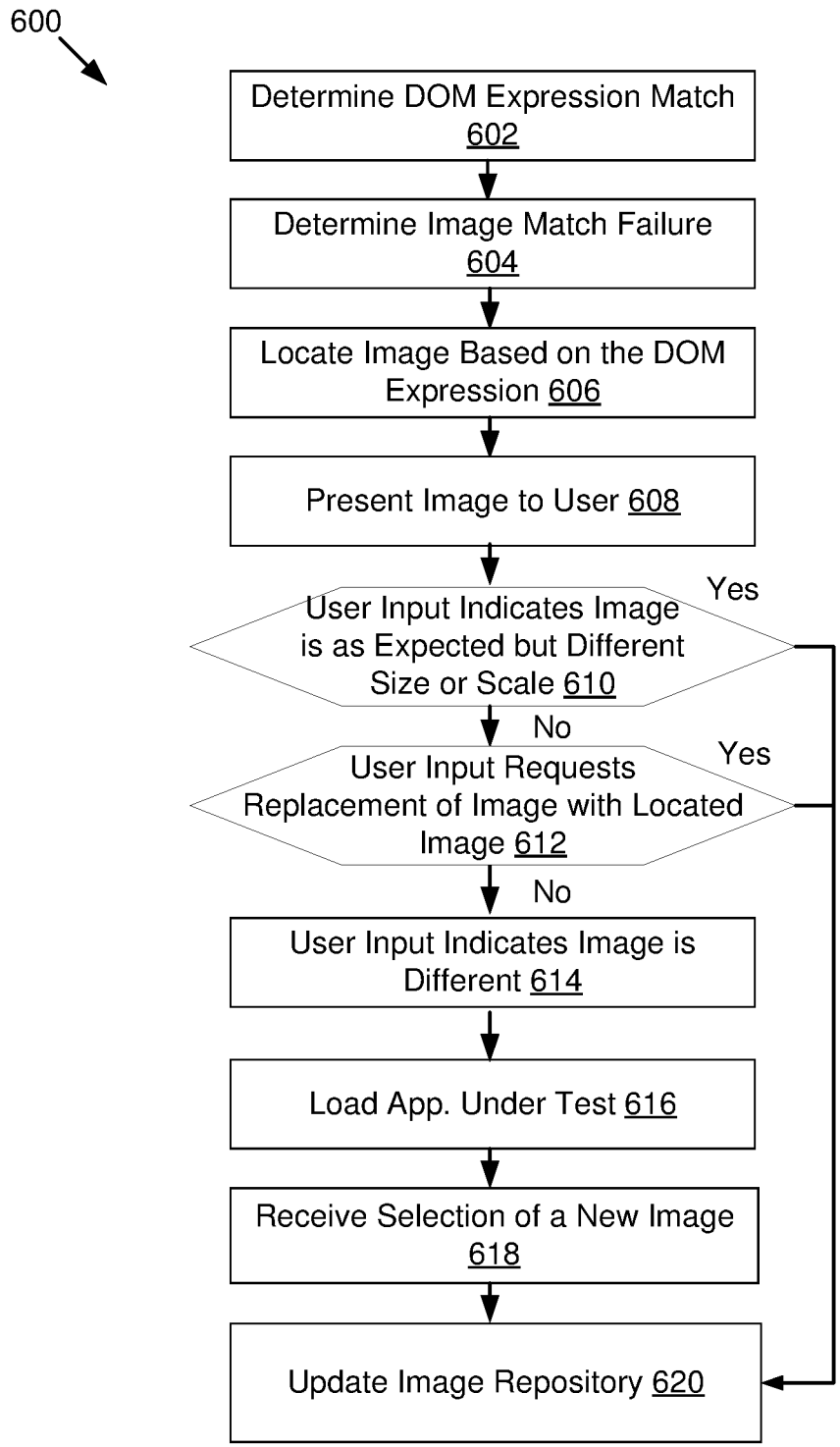
FIG. 6 is diagram of another example method for self-healing hybrid element identification illustrated according to one embodiment.

Referring to FIG. 6, another example method 600 for self-healing hybrid element identification is illustrated according to one embodiment. For clarity and convenience, FIG. 6 is described with reference to an example in which an element is identified by its image and a DOM location expression. However, in the example of FIG. 6, the element is located, at block 602, using the DOM expression, but the image found for this element, at block 604, is different than (i.e. does not match) the expected image.

In some embodiments, although the automated test is able to continue using the element identified based on the DOM location expression, at block 602, the identification healing engine 324 resolves the problem with the image to ensure robust element identification logic. At block 606, the identification healing engine 324 locates the image in the AUT based on the DOM expression, and presents, at step 608, that image to the user 112. In one embodiment, the identification healing engine 324 begins a dialogue with the user 112, e.g., asking whether the image presented (a) has a different scale, but is otherwise as expected, (b) should replace the expected image associated with the test script, (c) is different.

When the image located using the DOM is as expected, but is sized/scaled differently 610—Yes, the identification healing engine 324 updates, at 620, the image repository for that element to include the located image. When the user 112 requests replacement of the image associated with the test script with that located, at 606, using the DOM 612—Yes, the identification healing engine 324 updates, at 620, the image repository for that element replacing the previous image with the located image. When the user 112 indicated that the image located, at 606, using the DOM is a different image 614—Yes, the identification healing engine 324 load, at 616, the AUT; receives, at 618 a selection of a new image; and updates, at 620, the image repository for the element with the selected image.

Figure 7:
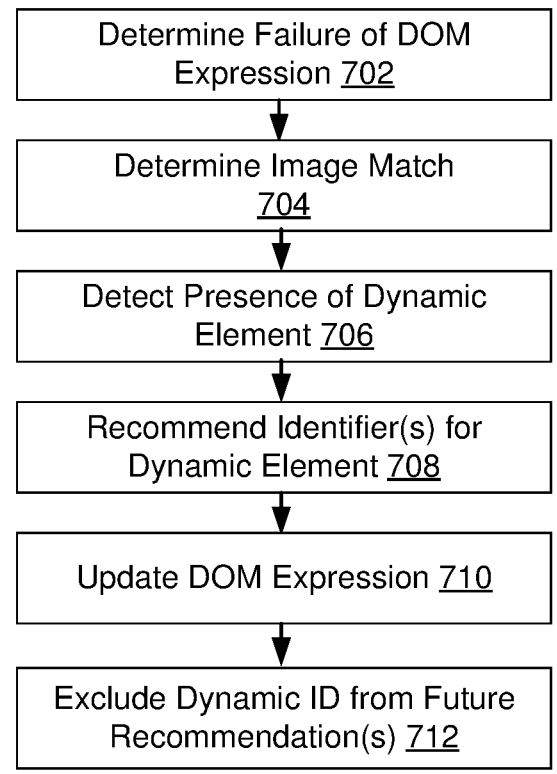
FIG. 7 is a diagram of an example workflow for dynamic element awareness illustrated according to one embodiment.

FIG. 7 is an example workflow 700 for dynamic element awareness illustrated according to one embodiment. For clarity and convenience, FIG. 7 is described with reference to an example in which an element is identified by its image and a DOM expression (e.g. id: 8675739). At block 702, the identification evaluation engine 322 determines a failure of the DOM expression. At block 704, the identification evaluation engine 322 determines that a match using the image exists.

In some embodiments, although the automated test is able to continue using the element identified based on the image at block 704, the identification healing engine 324 resolves the problem with the DOM based find expression to ensure robust element identification logic. In the illustrated embodiment, at block 706, the identification healing engine 324 determines that the DOM id is dynamic and recommends, at block 708, an alternative method of identification (e.g. a chained query, XPath, a set of static attributes/properties associated with the dynamic element). At block 710, the identification healing engine 324 updates the DOM (e.g. responsive to receiving a selection of a recommended identifier), and excludes, at block 712, the dynamic ID from future recommendations.

Figure 8:
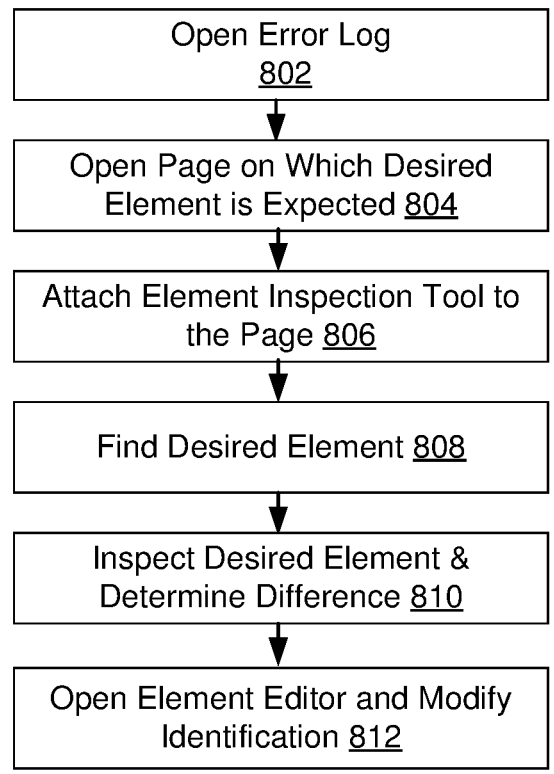
FIG. 8 is a diagram of an example workflow for manual "element not found" error debugging illustrated according to one embodiment.

FIG. 8 is a diagram of an example workflow 800 for manual "element not found" error debugging, from a user's perspective, illustrated according to one embodiment. In the illustrated embodiment, at block 802, the error log is opened by the user subsequent to receiving an "element not found" error. At block 804, the user opens the page on which the user expects to find the desired element in the AUT. At block 806, the user attaches the element inspection tool to the page opened at block 804. At block 808, the user finds the desired element on the page. At block 810, user inspects the attributes to determine the difference between the actual identifier of the element and expected (test) identifier. At block 812, the user opens the element editor and changes the value identification of the element.

Figure 9:
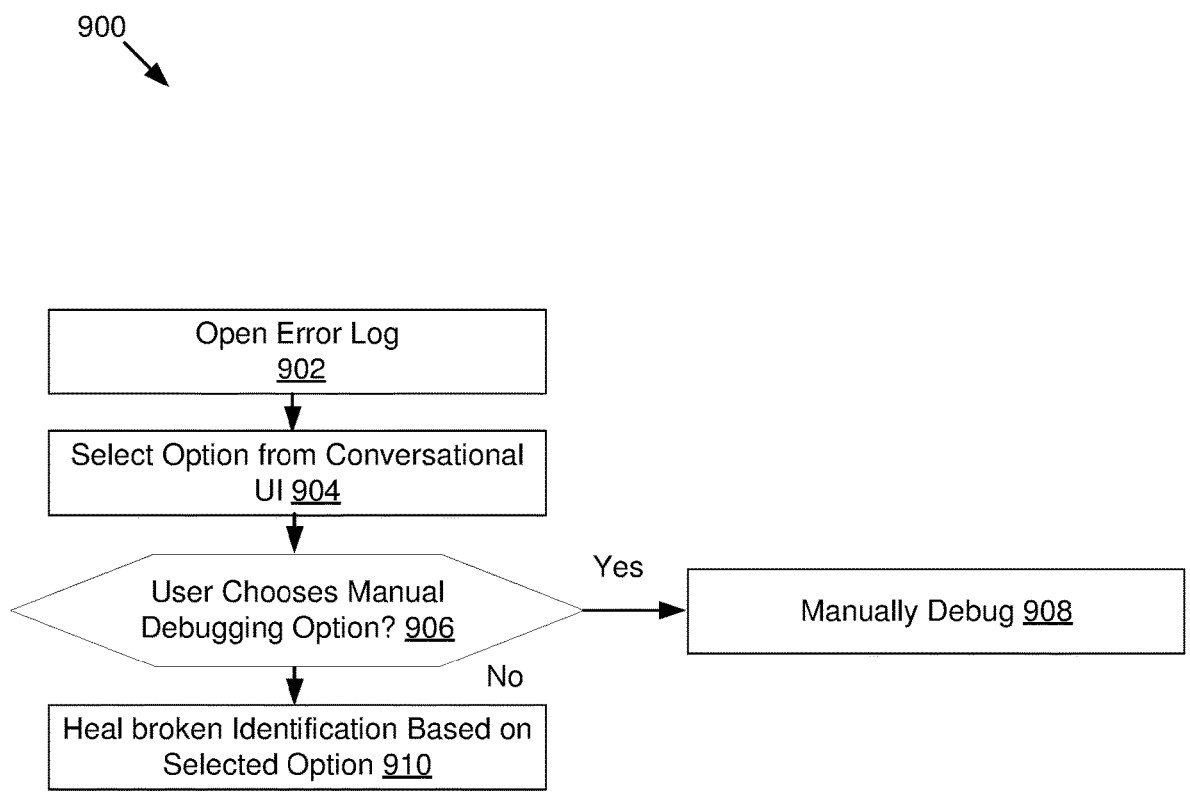
FIG. 9 is a diagram of an example workflow for self-healing hybrid identification illustrated according to one embodiment.

FIG. 9 is a diagram of an example workflow 900 for self-healing hybrid identification, from a user perspective, illustrated according to one embodiment. For clarity and convenience, consider the following example scenario:

| FIG. 1 | |
| --- | --- |
| Browser UI | DOM Structure <ol> |
| 1. BMW | <li> BMW<li/> |
| 2. Mercedes | <li> Mercedes<li/> |
| 3. VW | <li> VW<li/> |
| . . . | |

Then the second list item ("Mercedes") is removed, thereby reordering the existing list of items and the index of the list item with the text "VW" changes from 2 to 1. Assume the element identifier uses the element location (e.g. [tagName,<li>, index 2]). When using the self-healing hybrid identifier 132, the user opens, at block 902, the error log, and the self-healing hybrid identifier 132 navigates to a conversational user interface with options or suggestions generated by the self-healing hybrid identifier 132. For example, the conversational UI displays the options:

1. The element you are searching for is <li> with index 0
   2. The element you are searching for is <li> with index 1
   3. Manually choose from live version of the AUT.

The user selects, at block 904, an option from the conversational UI. When option 1 or 2 is selected 906—No, the self-healing hybrid identifier 132 heals, at block 910, the identifier (e.g. indicating the test element is <li> with Index 1 Element Data: Text contains VW when option 2 is selected), thereby saving the user 112 time and effort over the manual debugging process. When option 3 is manually selected by the user selected 906—Yes, the self-healing hybrid identifier 132 launches a manual debugging, e.g., using the manual debugging method 800 described in FIG. 8.

The workflow 900 may be repeated as the AUT is modified and re-tested. For example, assume that the text is changed from VW to Volkswagen in the AUT, and that the location-base identifier succeeds, but the image saved for the element is not a match. When using the self-healing hybrid identifier 132, the user opens, at block 902, the error log, and the self-healing hybrid identifier 132 navigates to a conversational user interface with options or suggestions generated by the self-healing hybrid identifier 132. For example, the conversational UI displays the options:

A. Replace test image with [new image found based on location-based identifier]

B. Manually choose image from live version of AUT.

The user selects, at block 904, an option from the conversational UI. When option A is selected 906—No, the self-healing hybrid identifier 132 heals, at block 910, the identifier (e.g. by replacing the image or adding the new image to the repository for the element), thereby saving the user 112 time and effort over the manual debugging process. When option B is manually selected by the user selected 906—Yes, the self-healing hybrid identifier 132 launches a manual debugging, e.g., using the manual debugging method 800 described in FIG. 8.

The workflow 900 may be repeated as the AUT is further modified and re-tested. For example, assume that "Mercedes" is added back, and that the location-based identifier fails, but the image saved for the element is not a match. When using the self-healing hybrid identifier 132, the user opens, at block 902, the error log, and the self-healing hybrid identifier 132 navigates to a conversational user interface with options or suggestions generated by the self-healing hybrid identifier 132. In the illustrated embodiment, the self-healing hybrid identifier 132 uses machine learning to offer (with a sufficiently high degree of confidence) one option in addition to manual debugging. For example, the conversational UI displays the options:

I. Replace identifier with [tagName<li>, index 2, textContent Volkswagen], approve?

II. Dismiss change and find element manually.

The user selects, at block 904, an option from the conversational UI. When option I is selected 906—No, the self-healing hybrid identifier 132 heals, at block 910, the identifier (e.g. by replacing the identifier with [tagName<li>, index 2, textContent Volkswagen], as indicated in option I), thereby saving the user 112 time and effort over the manual debugging process. When option II is manually selected by the user selected 906—Yes, the self-healing hybrid identifier 132 launches a manual debugging, e.g., using the manual debugging method 800 described in FIG. 8.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, engines, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure not limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    receiving, using one or more processors, a first testing identifier associated with a first element of an application under test;
    receiving, using the one or more processors, a second testing identifier associated with the first element of the application under test, wherein the first testing identifier and the second testing identifier are of a different type selected from a location-based identifier, an image-based identifier, and an attribute-based identifier;
    evaluating, using the one or more processors, the first testing identifier;
    determining, using the one or more processors, a failure of the first testing identifier to identify an element in the application under test;
    evaluating, using the one or more processors, the second testing identifier;
    identifying, using the one or more processors, the first element in the application under test based on the second testing identifier; and
    repairing, using the one or more processors, the first testing identifier to identify the first element in the application under test.

2. The computer-implemented method of claim 1, wherein the first testing identifier and the second testing identifier are received by recording a test session in which a user interacts with elements of the application under test.

3. The computer-implemented method of claim 2, wherein the first testing identifier and second testing identifier are determined and suggested for use to identify the first element in the application under test during the recorded test session.

4. The computer-implemented method of claim 1, further comprising:
    generating the first testing identifier and the second testing identifier; and
    recommending use of the first testing identifier and second testing identifier to identify the first element in the application under test for testing.

5. The computer-implemented method of claim 1, further comprising:
    presenting a suggested repair to a user, wherein repairing the first testing identifier is responsive to receiving user input approving the suggested repair.

6. The computer-implemented method of claim 5, wherein the suggested repair is generated based on one or more of machine learning and a best practice.

7. The computer-implemented method of claim 1, wherein repairing the first testing identifier does not alter a type associated with the first testing identifier.

8. The computer-implemented method of claim 1, wherein repairing the first testing identifier alters a type associated with the first testing identifier.

9. The computer-implemented method of claim 1, further comprising:
    receiving a third testing identifier;
    receiving a fourth testing identifier, a set of identifier types associated with the first and second test identifiers differing from a set of identifier types associated with the third and fourth testing identifiers;
    evaluating the third testing identifier;
    determining a failure of the third testing identifier to identify an element in the application under test;
    evaluating the fourth testing identifier;
    identifying a second element in the application under test based on the fourth testing identifier; and repairing the third testing identifier to identify the second element in the application under test.

10. A system comprising:
one or more processors
a memory storing instructions that, when executed by the one or more processors, cause the system to:
receive a first testing identifier associated with a first element of an application under test;
receive a second testing identifier associated with the first element of the application under test, wherein the first testing identifier and the second testing identifier are of a different type selected from a location-based identifier, an image-based identifier, and an attribute-based identifier;
evaluate the first testing identifier;
determine a failure of the first testing identifier to identify an element in the application under test;
evaluate the second testing identifier;
identify the first element in the application under test based on the second testing identifier; and
repair the first testing identifier to identify the first element in the application under test.

11. The system of claim 10, wherein the first testing identifier and the second testing identifier are received by recording a test session in which a user interacts with elements of the application under test.

12. The system of claim 11, wherein the first testing identifier and second testing identifier are determined and suggested for use to identify the first element in the application under test during the recorded test session.

13. The system of claim 10, wherein the instructions, when executed by the one or more processors, further cause the system to:
generate the first testing identifier and the second testing identifier; and
recommend use of the first testing identifier and second testing identifier to identify the first element in the application under test for testing.

14. The system of claim 10, wherein the instructions, when executed by the one or more processors, further cause the system to:
present a suggested repair to a user, wherein repairing the first testing identifier is responsive to receiving user input approving the suggested repair.

15. The system of claim 14, wherein the suggested repair is generated based on one or more of machine learning and a best practice.

16. The system of claim 10, wherein repairing the first testing identifier does not alter a type associated with the first testing identifier.

17. The system of claim 10, wherein repairing the first testing identifier alters a type associated with the first testing identifier.

18. The system of claim 10, wherein the instructions, when executed by the one or more processors, further cause the system to:
receive a third testing identifier;
receive a fourth testing identifier, a set of identifier types associated with the first and second test identifiers differing from a set of identifier types associated with the third and fourth testing identifiers;
evaluate the third testing identifier;
determine a failure of the third testing identifier to identify an element in the application under test;
evaluate the fourth testing identifier;
identify a second element in the application under test based on the fourth testing identifier; and
repair the third testing identifier to identify the second element in the application under test.

* * * * *